United States Patent [19]

Sobhani

[11] Patent Number: 5,575,664
[45] Date of Patent: Nov. 19, 1996

[54] BALL CONTACT ROTARY CONNECTOR

[75] Inventor: Mohi Sobhani, Encino, Calif.

[73] Assignee: Hughes Aircraft Company, Los Angeles, Calif.

[21] Appl. No.: 597,086

[22] Filed: Feb. 5, 1996

Related U.S. Application Data

[63] Continuation-in-part of Ser. No. 452,932, May 30, 1995, abandoned.

[51] Int. Cl.⁶ .................................................. H01R 39/28
[52] U.S. Cl. .................................................. 439/17
[58] Field of Search ............................. 439/19, 17, 22, 439/27

[56] References Cited

U.S. PATENT DOCUMENTS

| | | | |
|---|---|---|---|
| 1,821,132 | 9/1931 | Baker | 439/17 |
| 4,904,190 | 2/1990 | Plocek et al. | 439/17 |
| 4,953,223 | 8/1990 | Householder | 439/17 |
| 5,321,583 | 6/1994 | McMahon | 439/17 |
| 5,429,508 | 7/1995 | Brevick | 439/19 |

*Primary Examiner*—Gary F. Paumen
*Attorney, Agent, or Firm*—M. E. Lachman; M. W. Sales; W. K. Denson-Low

[57] ABSTRACT

A rotary connector employing rolling conductive members. Two or more electrically isolated assemblies comprising pairs of primed wiring boards or flexprint circuits are disposed in a housing. The printed wiring boards have conductors disposed on adjacent surfaces. The conductors are electrically connected using the rolling conductive members. An insulating spacer is disposed between the metallic conductors of each of the printed wiring boards that hold them in place. The assemblies are disposed adjacent each other, and a shaft is secured to selected printed wiring boards. The shaft is rotatably secured to the housing using a rotary bearing, and the other printed wiring boards are secured to the housing. The printed wiring boards have electrical wires soldered thereto that permits the flow of electrical signals through the rotary connector, and which may be routed to electrical connectors or sensors. A retainer secures the assemblies together to maintain pressure between the metallic conductors and the rolling conductive members. Thus, the shaft is secured to one set of printed wiring boards and is rotatable relative to the housing due to the bearing. The other printed wiring boards are fixed relative to the housing. The rotation of the shaft therefore causes rotation of the one set of printed wiring boards relative to the other set of boards, while electrical conduction is maintained between the conductors by means of the plurality of rolling conductive members.

9 Claims, 3 Drawing Sheets

BALL CONTACT ROTARY CONNECTOR

This application is a continuation-in-part of U.S. patent application Ser. No. 08/452,932, filed May 30, 1995, now abandoned.

BACKGROUND OF THE INVENTION

The present invention generally relates to rotary connectors, and more particularly, to an improved rotary connector comprising rotatable insulating members having conductive rings electrically interconnected with rolling conductive members. A second embodiment of the present invention provides for a rotary connector that employs ball contacts that make electrical contact with conductive rings comprising plated V- or U-shaped grooves disposed on printed wiring boards. By creating plated grooves (V or U shape) on the surface of the printed wiring boards, the balls rotate on edges the grooves. The contact area between the ball and conductors on the printed wiring boards is increased by four fold from a design where the balls contact flat tracks or conductors of the printed wiring board, such as in the first embodiment of the present invention.

Two or more identical conductive rings formed by chemical or mechanical processes on electrically isolated materials, such as on the printed wiring boards, are connected using a rolling conductive member such as a stainless steel ball or a multiplicity of conductive balls (or rollers), for example. The design of the groove-shaped conductors is such that their surfaces provide for smooth rolling of the balls. The rotary connector has an isolating spacer, a shaft and a means for maintaining pressure between the conductors and the balls when the conductors move relative to one another.

The present invention allows construction of rotating connectors having several electrical signals transmitted from a stationary source to moving parts with minimum contact resistance. A rolling motion dissipates only 1/10th the amount of energy of friction-type motion. This means that the rolling ball connector can perform at higher speeds for a longer lifetime and at lower cost.

Prior art relating to the present invention include slip ring devices and cable wrap assemblies. The disadvantages of slip ring devices and cable wrap assemblies are that they are bulky, heavy, difficult or impossible to repair, very expensive, and brush or solder joints used therein often fail during operation. More specifically, conventional slip ring connectors, for example, are very fragile device. In harsh environments, such slip ring connectors often fail due to the fragile nature of brushes and rings used therein. Complicated bulky cable wrap assemblies are typically used to permit multiple electrical signals to be transmitted from a stationary source to a moving component. The cable wrap assemblies have many field-related problems such as wear and tear, decomposition of solder joints, and the like.

Therefore, it is an objective of the present invention to provide for a rotary connector comprising rotatable insulating members having conductive rings electrically interconnected with rolling conductive members that improves over conventional slip ring devices and cable wrap assemblies.

SUMMARY OF THE INVENTION

In order to meet the above and other objectives, the present invention is an improved rotary connector comprising rotatable insulating members having conductive rings electrically interconnected with rolling conductive members, such as ball- or roller-type contacts. Two or more electrically isolated assemblies comprising pairs of insulating members, such as printed wiring boards or flexprint circuit, are disposed in a housing. The insulating members are configured with conductive rings disposed on adjacent surfaces thereof. The conductive rings may be formed by chemical or mechanical processes, for example. The conductive rings are electrically connected using the rolling conductive members, such as using a multiplicity of conductive balls or rollers, such as stainless steel balls, for example. The design of the rolling conductive members is such that their surfaces provide for smooth rolling action.

An isolating spacer and ball locator is disposed between the conductive rings of each of the insulating members that hold the rolling conductive members in place. The insulating members are disposed adjacent to each other, and a shaft is secured to selected insulating members. The shaft is rotatably secured to the housing by means of a rotary bearing. The other insulating members are secured to the housing. The insulating members have electrical wires soldered thereto that permits the flow of electrical signals through the rotary connector. The electrical wires are typically routed to electrical connectors or sensors, or the like.

A retainer secures both electrically isolated assemblies together to maintain pressure between the conductive rings and the rolling conductive members of both assemblies when the conductive rings move relative to each another. In one embodiment of the connector, outer printed wiring boards or flexprint circuits are configured to have circular grooves disposed therein that secure a plurality of retaining members therein that extend around the outer edges of both electrically isolated assemblies to secure the assemblies together and insure electrical contact between the rolling conductive members and the conductive rings.

Thus, the shaft is secured to selected insulating members and is rotatable relative to the housing due to the bearing. Selected insulating members are fixed relative to the housing. The rotation of the shaft therefore causes rotation of the movable insulating members relative to the fixed insulating members, while electrical conduction is maintained between the conductive rings by means of the plurality of rolling conductive members (balls or rollers). A second embodiment of the present invention provides for a rotary connector that employs ball contacts that make electrical contact with conductive rings comprising plated V- or U-shaped grooves disposed on printed wiring boards. By creating plated grooves (V or U shape) on the surface of the printed wiring boards, the balls rotate on edges the grooves. The contact area between the ball and conductors on the printed wiring boards is increased by four fold from a design where the balls contact flat tracks or conductors of the printed wiring board, such as in the first embodiment of the present invention.

Two or more identical conductive rings formed by chemical or mechanical processes on electrically isolated materials, such as on the printed wiring boards, are connected using a rolling conductive member such as a stainless steel ball or a multiplicity of conductive balls (or rollers), for example. The design of the groove-shaped conductors is such that their surfaces provide for smooth rolling of the balls. The rotary connector has an isolating spacer, a shaft and a means for maintaining pressure between the conductors and the balls when the conductors move relative to one another.

The present invention allows construction of rotating connectors having several electrical signals transmitted from a stationary source to moving parts with minimum contact resistance. A rolling motion dissipates only 1/10th the amount of energy of friction-type motion. This means that the rolling ball connector can perform at higher speeds for a longer lifetime and at lower cost.

The present invention allows the construction of rotating connectors that permit multiple electrical signals to be transmitted from a stationary source to a moving component with minimum contact resistance. The rolling motion implemented in the rotary connector dissipates only 1/10th the energy of friction-type motion of the conventional connectors. The rotary connector is able to perform at higher speeds over a longer lifetime and at a lower cost.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

Figure 1:
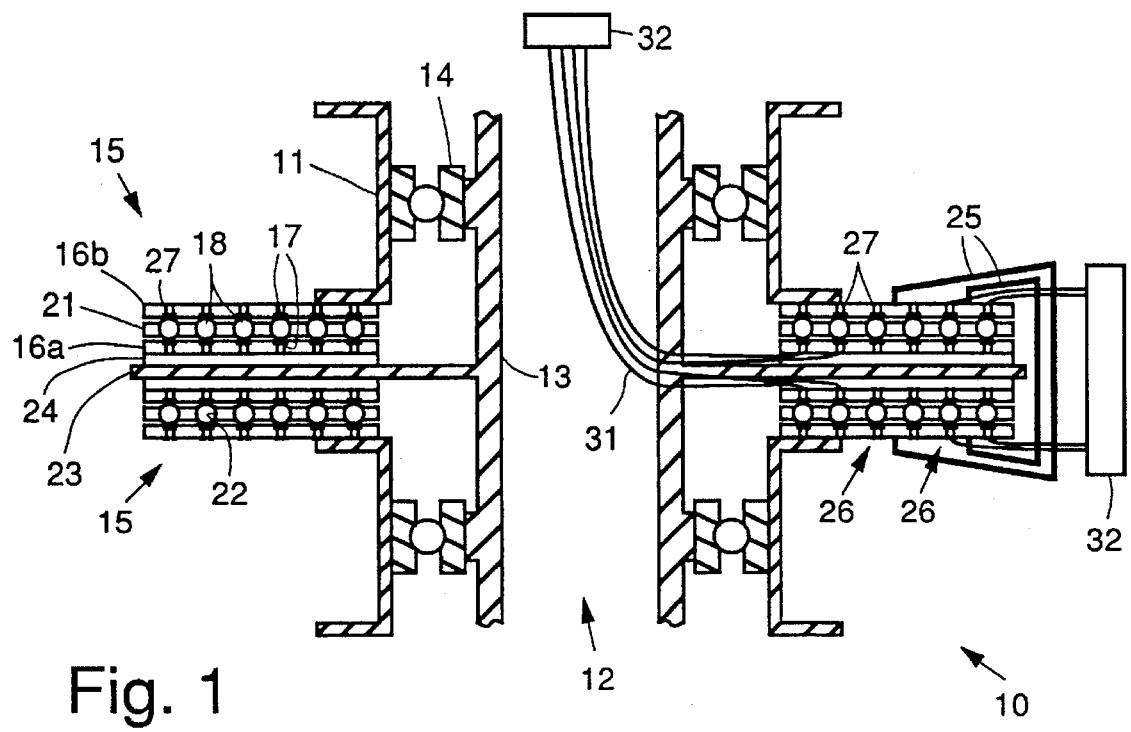
FIG. 1 illustrates a cross sectional view of a rotary connector in accordance with the principles of the present invention.
Figure 2:
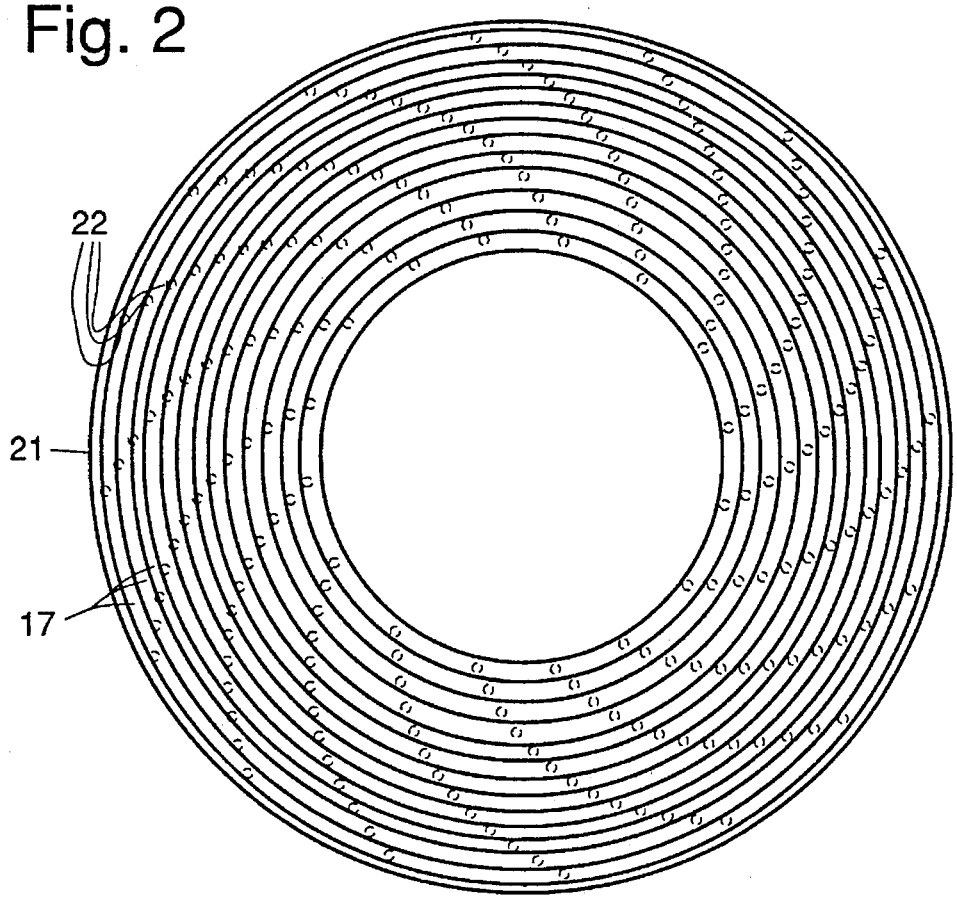
FIG. 2 shows a top view of an insulating member and its conductive rings employed in the rotary connector of FIG. 1.

Referring to the drawing figures, FIG. 1 shows a cross sectional view of a rotary connector 10 in accordance with the principles of the present invention. The rotary connector 10 is comprised of a housing 11 that has an opening 12 therein and through which a rotatable shaft 13 is disposed. The shaft 13 is rotatably secured to the housing 11 by means of a bearing 14 which permits relative rotational motion therebetween. The rotary connector 10 also includes a plurality of electrical components that include at least two pair of electrically isolated assemblies 15 that comprises insulating members 16a, 16b (printed wiring boards 16a, 16b or flexprint circuits 16a, 16b) having a plurality of conductive rings 17 formed on their adjacent surfaces or sides. FIG. 2 shows a top view of an outer insulating member 16b and the conductive rings 17 employed in the rotary connector 10 of FIG. 1. The conductive rings 17 may be formed by chemical or mechanical processes, such as by etching or machining, for example. The conductive rings 17 or conductors are electrically connected using rolling conductive members 18, such as a multiplicity of conductive balls 18 or rollers 18, which may be stainless steel balls 18, for example. The design of the rolling conductive members 18 is such that their surfaces provide for smooth rolling thereof.

Figure 3:
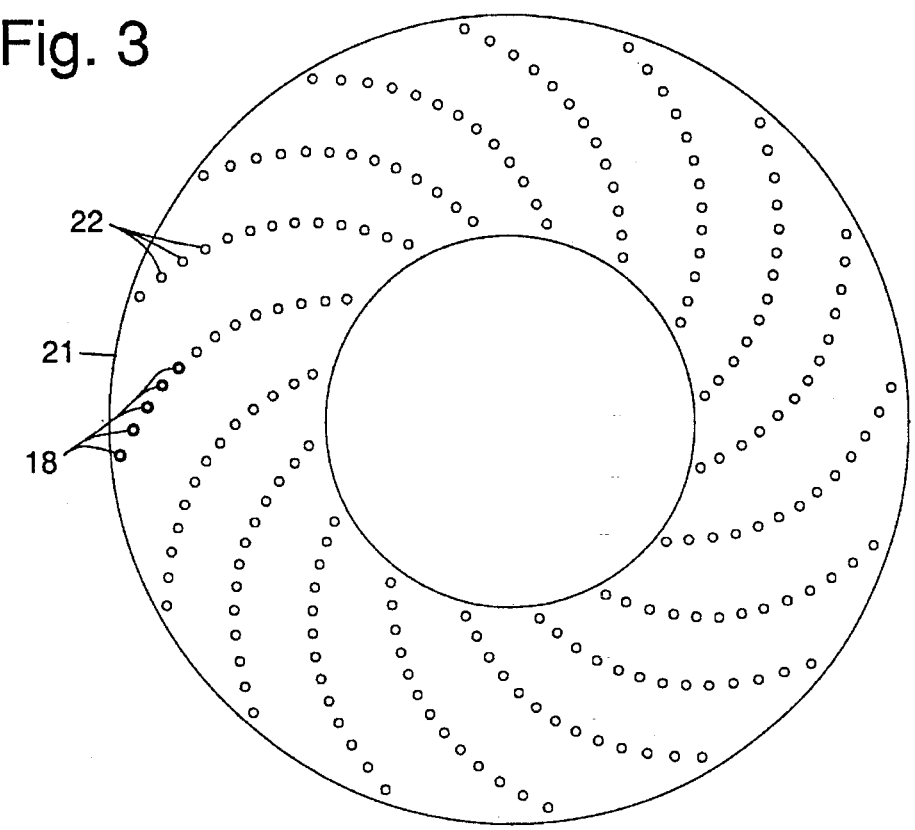
FIG. 3 shows a top view of a spacer employed in the rotary connector of FIG. 1.

More specifically, and with reference to FIG. 3, it shows a top view of an insulating spacer 21 employed in the rotary connector of FIG. 1. The insulating spacer 21 is disposed between the adjacent surfaces of the respective pair of boards 16a, 16b between the conductive rings 17 thereof. There is a one-to-one correspondence between the number of conductive rings 17 on adjacent boards 16a, 16b. The insulating spacer 21 has a plurality of holes 22 formed therethrough that are designed to hold a plurality of conductive ball contacts (balls 18) or rollers 18 therein. The holes 22 are registered so that a plurality of conductive balls 18 are located in a circular arrangement such that each conductive ring of the plurality of adjacent rings 17 makes contact with on the order of three or more conductive balls 18. Thus, it can be seen that the respective adjacent conductive rings 17 of each of the insulating boards 16a, 16b or flexprint circuits 16a, 16b are interconnected by means of the respective conductive bails 18.

Figure 4:
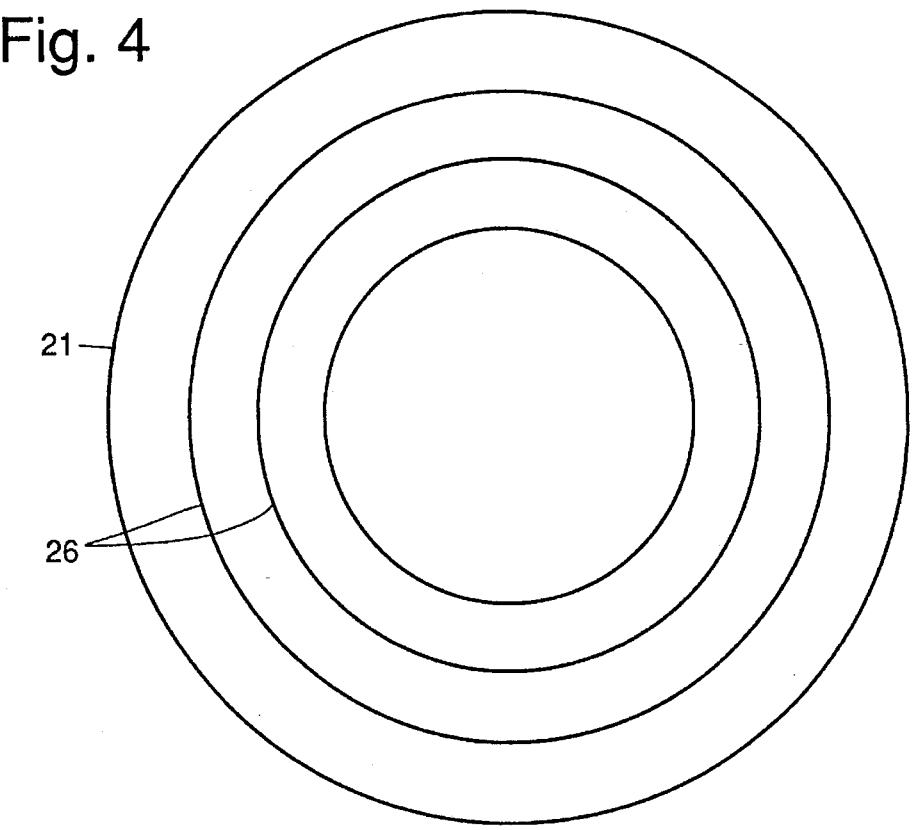
FIG. 4 shows a top view of an outer surface of an insulating member and its retaining grooves employed in the rotary connector of FIG. 1.

Two sets of boards 16a, 16b are formed in this manner. The two sets of boards 16a, 16b having the spacers 21 and conductive balls 18 disposed therebetween are secured to the rotatable shaft 13, such that one insulating member 16a is secured to either side of a disk 23, such as a metal disk 23, for example, extending from the shaft 13. The insulating members 16a, 16b may be secured to the metal disk 23 by means of a layer of adhesive 24, such as a layer of epoxy 24, for example. FIG. 4 shows a top view of an outer surface of an insulating member 16b and retaining grooves 26 employed in the rotary connector 10 of FIG. 1. More specifically, distal surfaces of the outermost boards 16b have a plurality of retaining grooves 26 formed therein and a plurality of spring-loaded retainers 25, for example, (shown for clarity on one side of FIG. 1 ) are placed therein and extend from the outer surface of one outermost board 16b to the outer surface of the other outermost board 16b so that all of the boards 16a, 16b are compressed and tightly held together. This insures contact between the respective conductive rings 17 and the conductive balls 18.

A plurality of plated through vias 27 are formed through the boards 16a, 16b that contact the conductive rings 17. Electrical wires 31 are soldered or otherwise secured to each of the conductive rings 17 by way of the plated through vias 27. The electrical wires 31 are appropriately routed to electrical connectors 32 or sensors 32 that permit coupling of electrical signals through the electrical connectors 32 to or from the sensors 32, for example.

Thus, it can be seen that the rotary connector 10 comprises two sets of boards 16a, 16b having adjacent conductive rings 17 interconnected by balls 18. Adjacent boards 16a of the two sets are secured to the rotatable shaft 13, such as to respective surfaces of the metal disk 23 by means of the layer of epoxy 24, for example. The metal disk 23 may be connected to the shaft 13 or to the housing 11 depending upon the application. Thus, it can be seen that the shaft 13 and the boards 16a connected thereto are free to rotate relative to the other boards 16b and the housing 11 (or shaft 13 ) by means of the motion permitted between the conductive rings 17 and the conductive balls 18. More specifically, the boards 16a secured to the metal disk 23 are free to rotate with respect to the outermost boards 16b through the action of the metal balls 18. The distinction between fixed and mobile portions of the rotary connector 10 is arbitrary, and the two rotatable portions rotate relative to each other.

An embodiment of the rotary connector 10 has been designed and tested that demonstrates the transmission of 52 signals in a rotary motion configuration and provides for the identical capability when compared with a corresponding conventional (friction) slip ring assembly, or complicated cable wrap assembly. The present invention has been designed to replace conventional slip ring devices and cable wrap assemblies in many of their applications. In addition, there are many other commercial and military applications for the rotary connector 10 including automotive and aircraft applications.

Figure 5A:
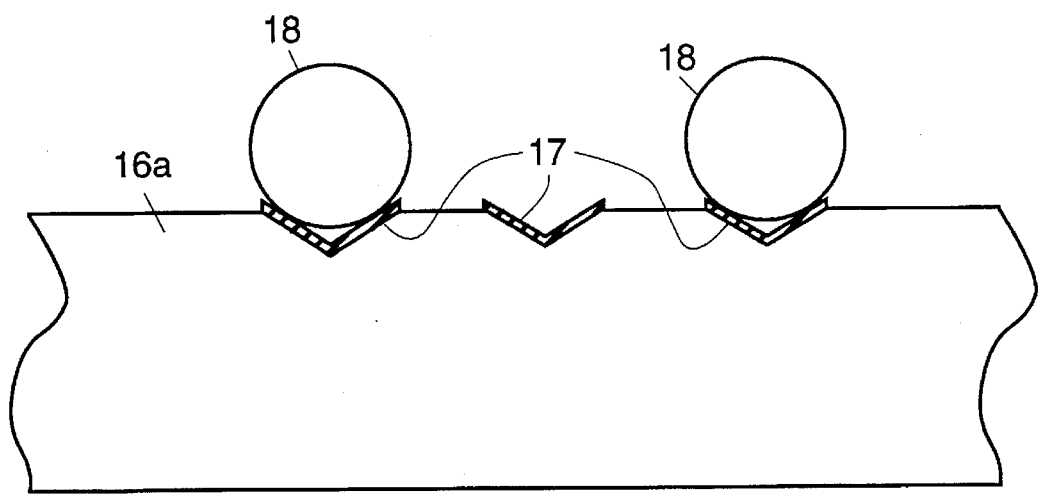
FIGS. 5a and 5b illustrate V- and U-shaped grooves that may be employed in a second embodiment the connector of FIG. 1.
Figure 5B:
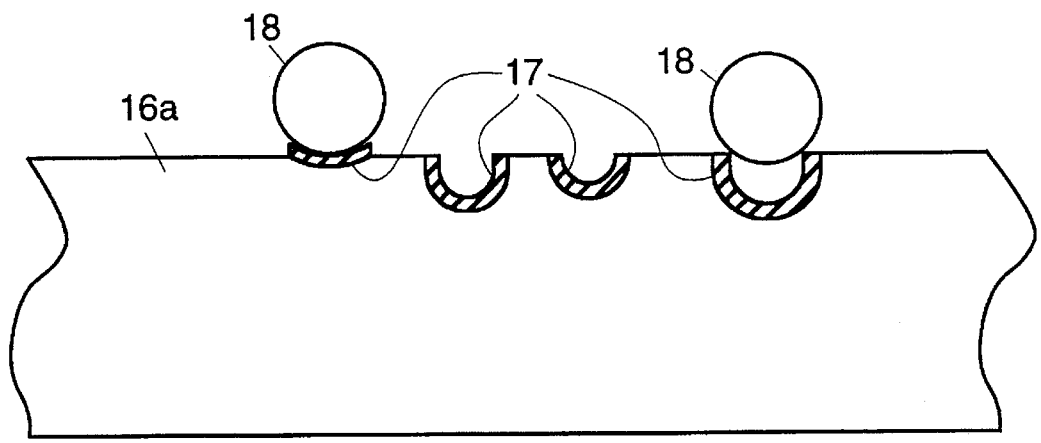

FIG. 1 in conjunction with FIGS. 5a and 5b illustrate a second embodiment of the present ball contact rotary connector 10. In this second embodiment of the connector 10, a first plurality of printed wiring boards 16a comprising insulating boards 16a or flexprint circuits 16a have grooved conductive rings 17 (illustrated in FIGS. 5a and 5b) disposed on their outer sides, and face a correspondingly configured second plurality of printed wiring boards 16b. The first plurality of printed wiring boards 16a are fastened onto the shaft 13 of the fixed part of the connector 10. The second plurality of printed wiring boards 16b or flexprint circuits 16b are also made of insulating materials and have an identical number of grooved conductive rings 17 as those on the first plurality of printed wiring boards 16a. FIGS. 5a and 5b illustrate various V- and U-shaped grooves that may be employed in the second embodiment of the connector 10.

The insulating spacer 21 (shown in FIG. 3) is disposed between the first and second opposed pairs of printed wiring boards 16a, 16b. Each printed wiring board 16a, 17b has plated through holes or vias 27 where the wires 31 from connectors 32 are soldered to vias 27. The wires are routed through the shaft 13 for the first printed wiring board 16a to the connector 32 and by way of the housing from the second printed wiring board 16b to the connector 32. The distinction between fixed and mobile part of the connector 10 is arbitary, and the two parts rotate relative to each other. The just-described embodiment has been built and is tested and works as designed.

The second embodiment of the rotary connector 10 employs rolling conductive members 18 comprising conductive balls 18 (such as stainless steel balls 18 or conductive rollers) that make electrical contact with the plated V- or U-shaped grooved conductive rings 17 that are formed on the printed wiring boards 16a, 16b. By creating plated V or U shape grooves 17 comprising the grooved conductive rings 17 on the surface of the printed wiring boards 16a, 16b, the balls 18 rotate on edges of the grooves 17. The contact area between the balls 18 and grooved conductive rings 17 on the printed wiring boards 16a, 16b is increased by four fold compared to using balls 18 that contact flat tracks or conductors 17 on the printed wiring boards 16a, 16b, such as in the first embodiment of the present invention.

As in the first embodiment, the second embodiment of the rotary connector 10 employs the isolating spacer 21, shaft 13 and spring-loaded retainers 25 for maintaining pressure between the groove-shaped conductive rings 17 and the balls 18 when the conductive rings 17 move relative to one another. The present invention allows construction of rotating connectors having several electrical signals transmitted from a stationary source to moving parts with minimum contact resistance.

The design of the groove-shaped conductive rings 17 is such that their surfaces provide for smooth rolling of the balls 18. The rolling motion of the second embodiment of the rotary connector 10 dissipates only 1/10th the amount of energy of friction-type motion. The present rolling ball connector 10 can perform at higher speeds for a longer lifetime and at lower cost.

Thus a rotary connector comprising rotatable insulating members having conductive rings electrically interconnected with rolling conductive members has been described. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A rotary connector comprising:

a housing having an opening therein;

a rotatable shaft disposed through the opening in the housing that is rotatably secured to the housing by means of a bearing that permits relative rotational motion therebetween;

first and second electrically isolated assemblies adjacently coupled to the shaft that each comprise:

two adjacently disposed insulating members having a plurality of conductive grooves formed on adjacent inner surfaces thereof;

an insulating spacer disposed between the adjacent inner surfaces of the respective adjacently disposed insulating members between the conductive grooves thereof that has a plurality of holes formed therethrough in registration with the conductive grooves; and a plurality of conductive rolling members disposed in the plurality of holes of the insulating spacer that provide for electrical contact between the respective conductive grooves of the adjacently disposed insulating members;

and wherein one said adjacently disposed insulating member of each of the electrically isolated assemblies is secured to the rotatable shaft and wherein the other said adjacently disposed insulating member of each of the electrically isolated assemblies is secured to the housing;

retaining means coupled to the first and second electrically isolated assemblies for compressing them together to insure contact between the conductive grooves and the conductive rolling members of the electrically isolated assemblies; and a plurality of electrical wires conductively coupled to the conductive grooves of each of the electrically isolated assemblies to permit coupling of electrical signals through the rotary connector.

2. The rotary connector of claim 1 wherein the conductive grooves are chemically formed.

3. The rotary connector of claim 1 wherein the conductive grooves are mechanically formed.

4. The rotary connector of claim 1 wherein the holes are registered so that the plurality of conductive rolling members which comprise conductive balls are located in a circular arrangement such that each conductive groove makes contact with a plurality of the conductive balls.

5. The rotary connector of claim 1 wherein the one adjacently disposed insulating member of each of the electrically isolated assemblies is secured to a disk extending from the rotatable shaft.

6. The rotary connector of claim 1 wherein the retaining means comprises:

a plurality of grooves formed on distal surfaces of the outermost ones of the adjacently disposed insulating members; and a plurality of spring-loaded retainers disposed in the plurality of grooves that extend from the outer surface of one outermost insulating member to the outer surface of the other outermost insulating member so that all of the insulating members are compressed and tightly held together to insure contact between the conductive grooves and the conductive rolling members.

7. The rotary connector of claim 1 wherein the plurality of electrical wires are conductively coupled to the conductive grooves using a plurality of plated through holes formed through the insulating members.

8. The rotary connector of claim 1 wherein the conductive grooves comprise V-shaped grooves.

9. The rotary connector of claim 1 wherein the conductive grooves comprise U-shaped grooves.

* * * * *